March 3, 1936.  C. W. VOGT  2,032,962
FRUIT AND NUT FEEDING MECHANISM
Filed Nov. 22, 1934    6 Sheets-Sheet 1

INVENTOR
Clarence W. Vogt
BY
Dean, Fairbank, Hirsch & Foster
ATTORNEYS

March 3, 1936.  C. W. VOGT  2,032,962
FRUIT AND NUT FEEDING MECHANISM
Filed Nov. 22, 1934  6 Sheets-Sheet 2

INVENTOR
Clarence W. Vogt
BY
Dean, Fairbank, Hirsch & Foster
ATTORNEYS

March 3, 1936.  C. W. VOGT  2,032,962

FRUIT AND NUT FEEDING MECHANISM

Filed Nov. 22, 1934  6 Sheets-Sheet 3

INVENTOR
Clarence W. Vogt
BY
Dean, Fairbank, Hirsch & Foster
ATTORNEYS

March 3, 1936.　　　C. W. VOGT　　　2,032,962
FRUIT AND NUT FEEDING MECHANISM
Filed Nov. 22, 1934　　　6 Sheets-Sheet 4

March 3, 1936.    C. W. VOGT    2,032,962
FRUIT AND NUT FEEDING MECHANISM
Filed Nov. 22, 1934    6 Sheets-Sheet 6

INVENTOR
Clarence W. Vogt
BY
Dean, Fairbank, Hirsch & Foster
ATTORNEYS

Patented Mar. 3, 1936

2,032,962

UNITED STATES PATENT OFFICE 2,032,962

FRUIT AND NUT FEEDING MECHANISM

Clarence W. Vogt, Greenwich, Conn., assignor to Vogt Processes, Incorporated, Louisville, Ky., a corporation of Delaware Application November 22, 1934, Serial No. 754,241

19 Claims. (Cl. 107—1)

The present invention relates to a method of and apparatus for introducing pieces of normally solid edibles such as fruits and nuts or particles or pieces thereof into a flowing stream of plastic comestible material such as semi-frozen ice cream, water ice, or sherbet. These solid edibles are readily crushable and may be somewhat sticky due to the oils and/or juices contained therein, and when subjected to substantial compression may be crushed and compacted or matted together. This compression of the solids may result either from the stirring or agitating action to which they are subjected, in order to maintain the flow of such solids from a hopper or similar receptacle, and from the mechanical handling that they receive as an incident of transfer of the materials from said hopper to a mixing chamber where they are injected preferably forcibly into the continuous stream of plastic material which is usually flowing under pressure in a confined path.

An object of the present invention therefore is to provide a new and improved method and means for introducing pieces of solids, such as fruits and/or nuts, into a continuously flowing stream of edible plastic material, with a minimum amount of mechanical handling.

Another object is to provide a method and means whereby the mass of solids in a hopper is gently but effectively agitated to insure flow of said solids from the discharge end of said hopper, with a minimum amount of crushing, bruising or sub-division of the solids.

A further object is to provide a mechanism which will effectively stir a mass of solid pieces in a hopper to maintain a flow of said pieces therefrom, and which will not obstruct the mouth of the hopper or occupy any substantial space in the interior thereof.

As a feature of the invention, the mechanism for transferring the solids from the hopper to the mixing chamber has one or more pockets movable into position to receive the solids by gravity directly from the outlet of the hopper.

Each pocket is cyclically moved substantially into and out of communication with the confined path of travel of the plastic stream and its contents are progressively forcibly injected into the flowing stream, the solids being distributed lengthwise of the stream. Uniform distribution of the solids in the stream may be effected by stationary baffle means and/or by sharp deflections in the course of the flowing mixture of the solid and plastic material.

In the specific embodiment of the invention, the transfer device is rotary, carrying one or more plungers slidable in respective bores and defining therewith in retracted positions the pockets into which the solids flow by gravity from the hopper. The filled pockets are shifted out of communication with the hopper and into communication with the mixing chamber where the plungers are moved in their respective bores to forcibly eject the solids from their respective pockets. Means is provided for sealing the mouth of the pockets as they are passing from charging to discharging position and from discharging to charging position.

As another feature of the present invention, positively acting cam means are provided for actuating the plungers.

As another feature of the present invention, the means for preventing the arching over or jamming of the solids across the discharge end of the hopper, includes one or more lifting fingers arranged near the hopper outlet. The operation of these fingers is effected by means which does not block the mouth of the hopper, and which is advantageously not supported therefrom, so that no special type of hopper is required. The operating rods for these fingers lie close to the inclined wall of the hopper and substantially parallel thereto so that they do not take up much space in the interior of the hopper, and the fingers act to stir up the mass only near the discharge end of the hopper where the arching over or jamming of the solids is most liable to take place, so that the remainder of the solids in the hopper are not substantially disturbed or agitated.

As still another feature of the present invention, the transmission between the drive and the transfer mechanism includes a spring clutch which is automatically disengaged in the event that solid particles jam the mechanism. Furthermore, this clutch, when disengaged serves as an audible signal indicating to the operator that the machine has stalled.

The invention which represents an improvement over the fruit and nut feeder disclosed in my prior application, Serial No. 654,668, filed February 1, 1933 may be more fully understood from the following description in connection with the accompanying drawings wherein:—

Figs. 8, 9 and 10 are sections taken on the lines 8—8, 9—9 and 10—10 respectively of Fig. 4, Figs. 11 and 12 are views of the plungers forming part of the transfer device, Figs. 13 and 14 are sections taken on the lines 13—13 and 14—14 respectively of Fig. 10, Figs. 15 and 16 are sections taken on the lines 15—15 and 16—16 respectively of Fig. 4, Figs. 17 and 18 are sections taken on the lines 17—17 and 18—18 of Fig. 16, Fig. 20 is an elevational view showing a portion of the operating means for the agitators in the hopper, Fig. 21 is a section taken on the line 21—21 of Fig. 20, and Figs. 22 and 23 are views showing details of the agitating fingers.

In the specific embodiment of my invention, there is provided a conical hopper 10 into which solids such as nuts and/or fruits or particles thereof are deposited for delivery to a transfer or conveyer device 11 disposed directly below the discharge end of said hopper and adapted to carry the nuts and/or fruits from said hopper to a mixing chamber 12 where they are injected into a continuously flowing stream of plastic semi-frozen mix such as semi-frozen ice cream. This mix may be derived from any suitable source, such for instance as a batch freezer or it may be produced in a continuous freezer of the general type disclosed and claimed in my prior Patents Nos. 1,783,864, 1,783,865, 1,783,866 and 1,783,867, issued December 2, 1930 and flows through the mixing chamber 12 under at least hydrostatic and usually pump pressure.

Figure 1:
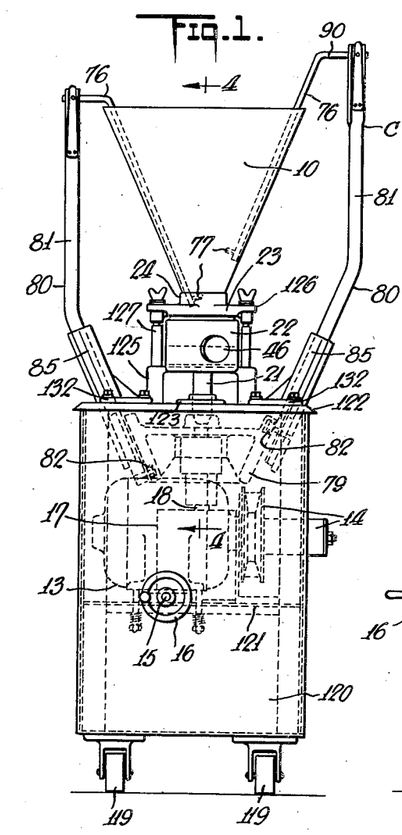
Figs. 1, 2 and 3 are front view, side view and plan view respectively of my improved nut and fruit feeding and mixing machine, the driving mechanism therefor being shown somewhat diagrammatically.
Figure 2:
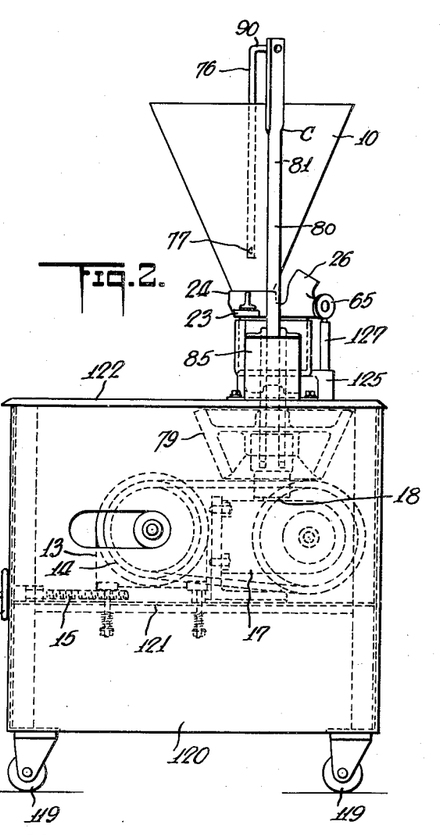
Figure 3:
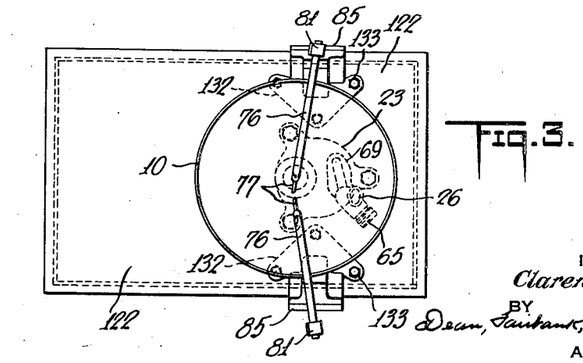
Figure 4:
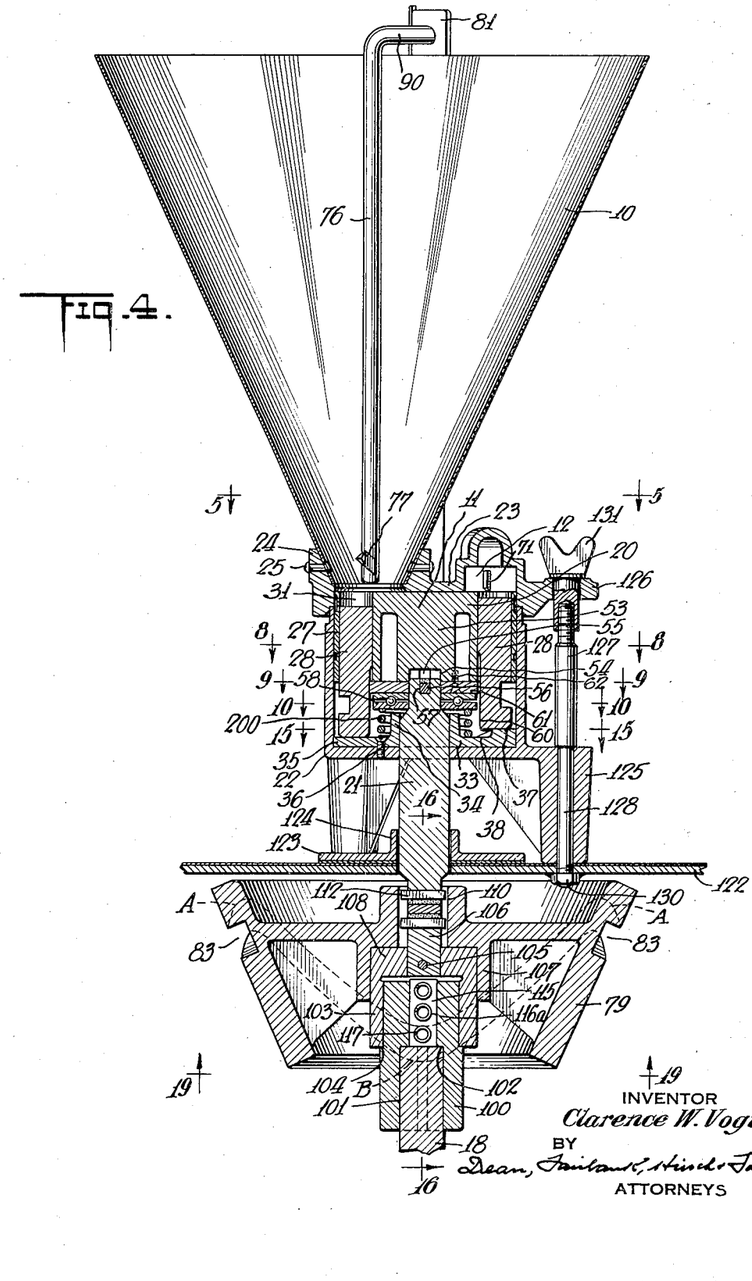
Fig. 4 is a section taken on the lines 4—4 of Figs. 1 and 5.

The transfer or conveyer device 11 is operated from a suitable source of power such as a motor 13 (Figs. 1 and 2). The driving connection between this motor 13 and the transfer device 11 may include a variable speed transmission 14 of any suitable type such as that known as the Reeves drive, the speed ratio of said transmission being controlled by an adjusting or control spindle 15 terminating at one end in a suitable operating hand-wheel 16. There may also be included in this driving connection between the motor 13 and the transfer device 11, a speed reducer 17 having a vertical outlet drive shaft 18 (Fig. 4) which serves to rotate the transfer device 11.

The transfer device 11 comprises a rotor 20 rotatable about a vertical axis and carrying rotor shaft 21 driven from the drive shaft 18. Rotor 20 has a close rotary fit in a stationary rotor casing 22 open at its upper end.

Figure 5:
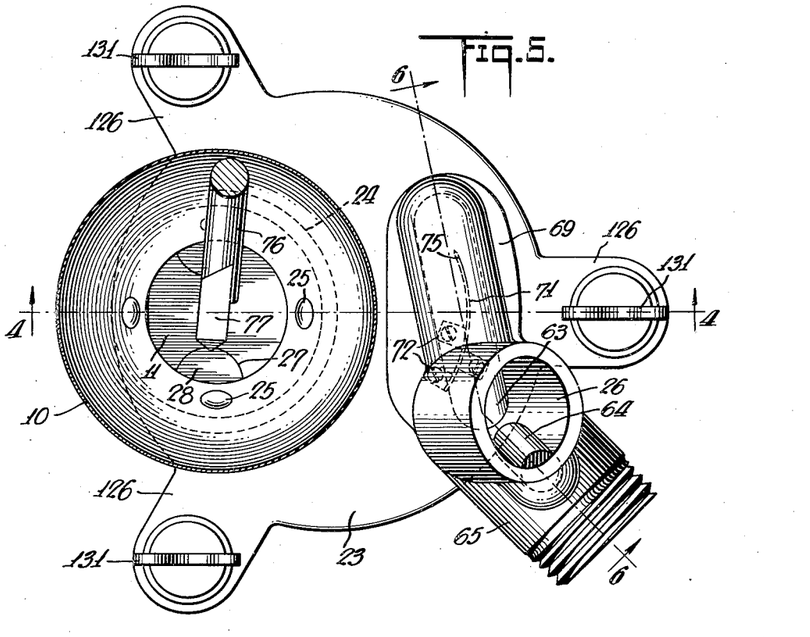
Fig. 5 is a section taken on the line 5—5 of Fig. 4.
Figure 6:
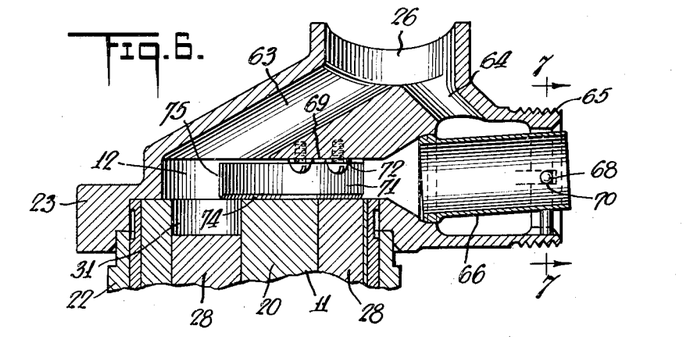
Fig. 6 is a section taken on the line 6—6 of Fig. 5.
Figure 7:
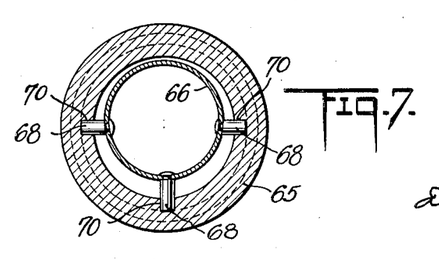
Fig. 7 is a section taken on the line 7—7 of Fig. 6.

The upper end of the rotor casing 22 is closed by a header plate 23 fixed to the hopper so as to be removable therewith, and which, for that purpose, is provided with an upwardly extending circular flange 24 having its inner peripheral surface flared to conform with the outside of the hopper 10, the latter being connected to said flange by any suitable means, as for instance rivets 25. The header 23 is also provided with a mix inlet 26 (Figs. 5 and 6) leading to the mixing chamber 12 which is formed between said header and the top of the rotor 20.

The rotor 20 is formed with a series of circularly arranged longitudinal bores 27, six identical bores being shown, spaced at equal distances from the axis of the rotor 20 and from each other. Plungers 28 slide in the bores 27.

The axis of the rotor 20 is arranged so that the bores 27, as they are moved in a circular path, about the axis of the rotor, come successively directly underneath the discharge end of the hopper and in direct communication therewith. The plungers 28, when directly underneath the hopper 10, are in their lowest position and form cup-shaped vertical pockets 31 with the bores 27, the upper ends of the plungers serving as the bottoms of said pockets. In this position, the pockets 31 are situated to receive the nuts and/or fruits flowing by gravity directly from the hopper 10. As the rotor 20 is rotated the filled pockets 31 pass under header plate 23 out of communication with the hopper and into communication with the mixing chamber 12.

Figures 15, 16, 17, 18:
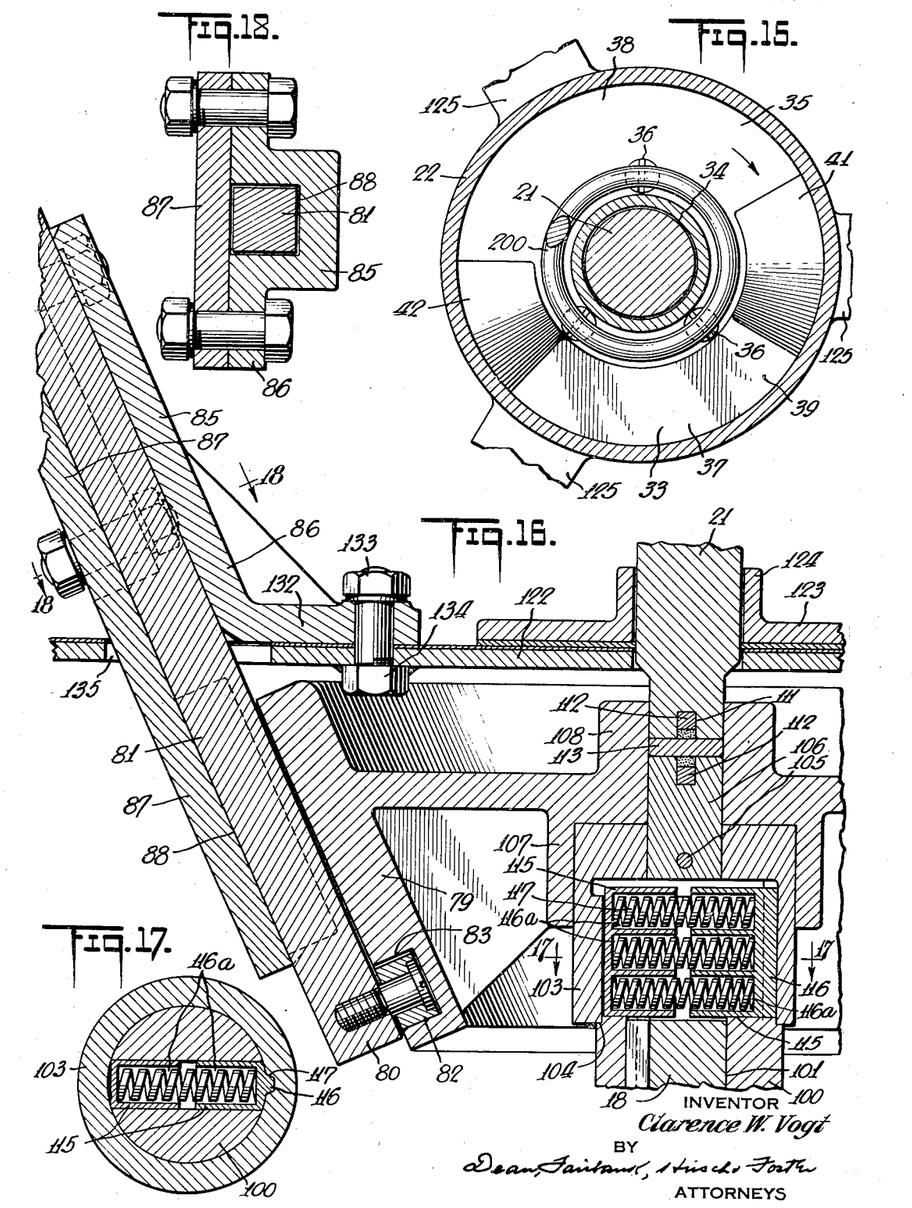

Means are provided for moving the plungers 28 in their respective bores 27 to free the nuts and/or fruits from their respective pockets 31 into the plastic mass when said pockets are in communication with the mixing chamber 12. Said means, in the specific form shown, includes a cam block 33 (Figs. 4, 10 and 15) having a central hub portion 34 encircling the rotor shaft 21, and having a flange 35 extending radially outwardly from said hub and connected to the base of the rotor casing 22 by any suitable means, as for instance screws 36. The cam block near the outer periphery of the flange 35, is provided with a circular cam track 37 over which the plungers 28 ride. This cam track 37 is provided with a flat low surface 38 directly below the discharge end of the hopper 10, and a flat high surface 39 directly below the mixing chamber 12. The flat surfaces 38 and 39 are interconnected at one end thereof by an ascending ramp 41, and at the other end by a descending ramp 42.

Figure 8:
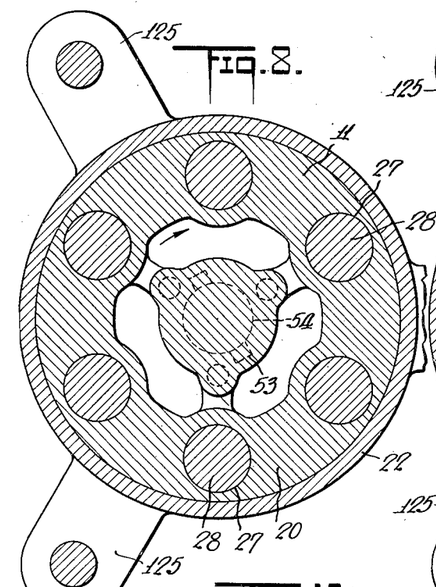
Figure 9:
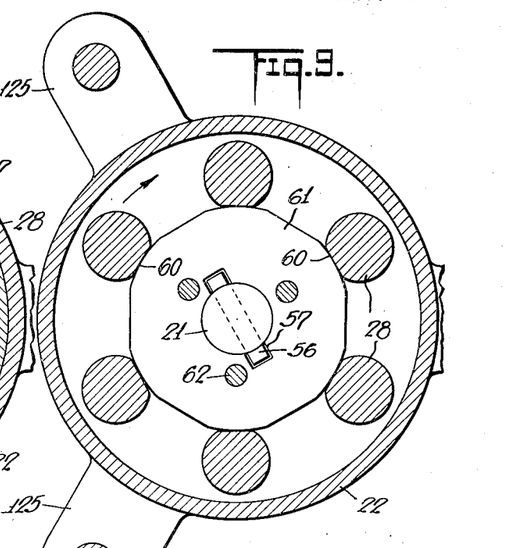
Figures 10, 11, 12, 13, 14:
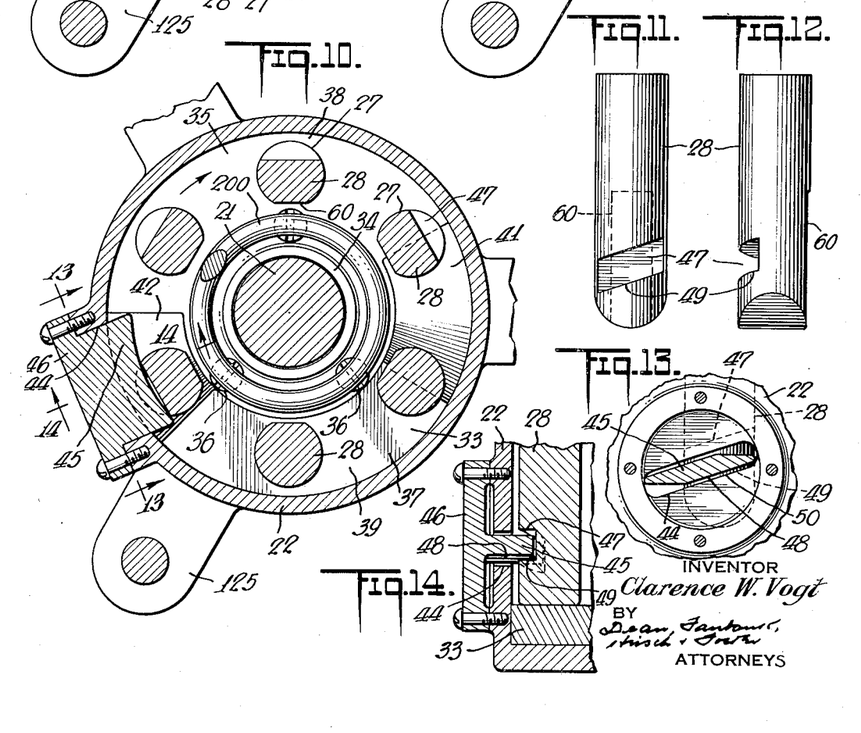

The lower ends of the plungers 28 are rounded in a circumferential direction with respect to the axis of the rotor as shown in Fig. 11 to facilitate the riding of these plungers over the circular cam track 37. When the plungers 28 are directly underneath the discharge end of the hopper 10, they will ride on or extend close to the flat low surface 38 so as to form the receiving pockets 31 above the plungers. As the rotor 20 is rotated in a clockwise direction as shown in Figs. 8, 9 and 10, the plungers are correspondingly moved away successively from the discharge end of the hopper 10 with charges of nuts and/or fruits in the pockets 31 until they reach the ramp 41. When the plunger has reached that position, the pockets 31 will be in direct communication with the mixing chamber 12. While the plungers are riding over the ramp 41 they will be moved vertically upward to eject the nuts and/or fruits from their associated pockets and introduce them into the partially frozen ice cream mix. After the plungers 28 have reached the flat high surface 39, they will be in their uppermost position, with their upper ends substantially flush with the upper ends of the corresponding bores 27, and the contents of their associated pockets emptied into the mixing chamber. In this position the plungers pass out of contact with the ice cream and under the header plate 23 which by virtue of an arrangement to be hereinafter described prevents leakage of cream between the plate and the rotor.

Positive cam means are provided for retracting the plungers into their lowermost position after they have ridden past the high flat surface 39. For that purpose, the rotor casing 22 is provided radially adjacent to the ramp 42 with a slot 44 (Figs. 10 to 14) into which extends a stationary cam plate 45 extending from a flange 46 bolted or otherwise fixed to the rotor casing 22. The outer portions of the plungers 28 facing the inner periphery of the rotor casing, are provided with cam grooves 47 adapted to successively coact with the cam plate 45 to move the corresponding plungers downwardly. For that purpose, the cam plate 45 presents a downwardly facing cam surface 48 inclined downwardly in a clockwise direction with respect to the horizontal as shown in Fig. 10, the cam grooves 47 having cam surfaces 49 correspondingly located and inclined to successively engage said cam surface 48 as said plungers are moved into the field of operation of said cam plate. The cam surfaces 48 and 49, in the form shown, slope at an angle of approximately 18° with respect to the horizontal.

In order to insure the movement of the plungers 28 into cooperative relationship with the cam plate 45, the latter's surface 50 adjacent to the high side of the cam surface 48 extends at an acute angle with said latter surface, and the edges of the plates between said surfaces are rounded as shown in Fig. 13. To permit the free movement of the plungers 28 past the cam plate 45, said plate has a thickness much smaller than the width of the cam grooves 47.

As the plunger moves to the left as shown in Fig. 13 and in a clockwise direction as shown in Fig. 10, the left-hand or lower end of the cam surface 49 of its groove 47 moves into engagement with the right-hand or higher end of the cam surface 48 of the cam plate 45. As the plunger 28 continues to move, the cam surface 49 on the plunger will slide along the cam surface 48 of the cam plate 45 and cause the plunger to move downwardly until the plunger has been freed from engagement with the cam plate 45. In this position, the plunger will ride over the low flat surface 38 or will be very close to it.

Concerning the plunger operating cam, it is worthy of note the plunger projecting cam upon which a substantial stress is imposed acts substantially directly against the lower ends of the plungers and axially thereof while the retracting cam (which needs to exert but slight pressure) works in slots in the sides of the plungers.

The rotor 20 is so supported on the rotor shaft 21 as to facilitate mounting or demounting of the latter. For that purpose, the rotor 20 is provided with a hub 43 having a central bore 54. Extending lengthwise of the bore 54 on diametrically opposite sides of the axis thereof, are a pair of slots 55 into which extends a pin 56 welded or otherwise fitted in a diametrical groove 57 formed at the upper end of the rotor shaft 21, which is reduced at said latter end to receive a ball thrust bearing 58, the plate like races of which are of a diameter nearly equal to the diameter of the rotor.

In order to prevent the rotation of the plungers 28 about their own axes as they rotate with the rotor, the portions of the plungers facing the axis of the rotor are provided with flat surfaces 60 (Figs. 4 and 12) firmly engaging corresponding flat surfaces on the periphery of a guide plate 61 held between the lower end of the rotor hub 53 and the thrust bearing 58, and secured to the rotor by any suitable means, as for instance machine screws 62. By means of this arrangement, the plungers are free to reciprocate in their corresponding bores, but are prevented from rotating about their own axes by the guide plate 61.

A powerful coiled expansion spring 200 encircling hub 34 and reacting against the flat portion of cam plate 33 engages the lower race plate of the ball thrust bearing 58 and forces the flat top of the rotor firmly against the flat under face of plate 23, thus effectively sealing all of the pockets as they pass out of registration with the hopper bottom and with the mixing chamber. Due to this arrangement no ice cream from the stream flowing under pressure through chamber 12 can escape around the rotor. The spring 200 compensates for wear or machining inaccuracies between the flat top of the rotor and the flat under face of plate 23.

If desired, the stream of plastic semi-frozen material which is introduced into the inlet 26 is divided into two streams, one of which passes into the mixing chamber 12 and in contact with the nuts and/or fruits being ejected from the pockets 31, the other stream by passing the mixing chamber and forming an annulus or casing for the mixture emerging from the mixing chamber 12. For that purpose, the header 23 is formed with a pair of passageways or ducts 63 and 64 (Figs. 5, 6) diverging from the mix inlet 26. The duct 63 leads into the inlet end of the mixing chamber 12 directly above the path of travel of the plungers 28, while the duct 64 leads into the top of the tubular extension 65 formed in the header 23.

Extending into the tubular extension 65 is a nozzle 66 open at both ends and having its inner or inlet end communicating with the outlet end of the mixing chamber 12 which is flared at said latter end to receive the inner end of the nozzle 66 and support it against transverse movement. For supporting the outlet end of the nozzle 66, said nozzle has pins 68 fixed thereto, as for instance by riveting, and extending into grooves 70 formed in the inner surface of the tubular extension 65.

Since the pressure of the plastic material on the upper portion of the tubular member 65 is greater than that on the lower portion, due to the position of the mix inlet 26, the nozzle 66 is advantageously tilted slightly upwardly towards the outlet end of the extension 65 so that its outlet end will be eccentric with respect to the outlet end of said extension. I have found that by means of this arrangement, the nuts or fruits are directed toward the top of the flowing stream of plastic mix and any tendency of these particles or pieces to settle toward the bottom of the partially frozen material completes the uniform distribution of them throughout the mass. It is worthy of note that no mechanical agitation is resorted to in order to obtain uniform distribution of the fruits and nuts through the mix.

The mixing chamber 12 has a main portion 69 extending in a direction coincident with the circular path of movement of the plungers 28 and sufficiently long so that two adjacent pockets 31 can fully communicate with it at the same time. The ascending ramp 41 is placed directly underneath this portion 69 of the mixing chamber 12 and extends an angular distance along the circular cam track 37 equal to the angular distance between adjacent bores 27. In the specific form shown, this angular distance is 60°.

With a plunger 28 at the base of the ascending ramp 41, its corresponding pocket 31 will be in full communication with the mixing chamber 12 near its outlet end. As this plunger 28 rides over the ascending ramp 41 it will substantially follow the direction of flow of the plastic mix in the main portion 69 of the mixing chamber 12 and will simultaneously move upwardly to discharge the fruits and/or nuts from its corresponding pocket into said chamber. When the plungers reach the top of the ascending ramp 41, it will be in its uppermost position with its top flush with the top of its corresponding bore 27 and its corresponding charge of nuts and/or fruits entirely ejected into the mixing chamber. In this cyclic position, the preceding plunger will be at the base of the ramp 41 ready to start its ejecting operation, so that nuts and/or fruits are continuously being discharged into the mixing chamber 12.

The speed of rotation of the rotor 20 is preferably regulated so that the plungers will travel circumferentially at a speed equal to substantially twice the average speed of flow of the plastic mix through the main portion 69 of the mixing chamber 12, so that the nuts and/or fruits are distributed substantially uniformly lengthwise of the plastic stream.

In order further to insure uniform distribution of the nuts and/or fruits throughout the plastic mass, there is provided a dispersion plate 71 extending substantially lengthwise of the main portion 69 of the mixing chamber and curved to substantially follow the circular path of movement of the axes of the plungers 28. For supporting the plate 71 in position, the upper edge thereof is advantageously provided with transversely extending fastening lugs 72 bolted or screwed to the header 23. The plastic material advancing into the chamber 12 will be split into two sections by the dispersion plate 71, while the nuts and/or fruits are forced upwardly into these sections. The dispersion plate 71 is advantageously formed with a knife edge 74 at the bottom and a knife edge 75 at the end thereof nearest to the inlet end of the mixing chamber 12 so as to facilitate the parting of the plastic material into two sections and to facilitate the parting of the nuts and/or fruits into corresponding sections in their upward movement into the chamber without crushing these nuts and/or fruits.

The mixing chamber 12 near the forward end of the dispersion plate 71 is offset almost radially outwardly of the rotor 20 so that the section of the mixture of plastic material and solids on the side of the plate 71 facing the axis of the rotor, will be projected towards the section of the mixture on the other side of said plate, so that a certain amount of mixing takes place in this region and the nuts and/or fruits will be more uniformly dispersed throughout the plastic mass. By using a stationary dispersion plate and lifting tube instead of mechanically operated agitating means, the nuts and/or fruits, as well as the mix, are handled as gently as possible while effecting the necessary intermixture.

As another feature of the present invention, new and improved means are provided for stirring the solid material in the hopper 10 to prevent arching over or jamming of said material across the discharge end of the hopper. Said means, in the specific form shown, includes a pair of rods 76 extending into the interior of the hopper at diametrically opposite sides of the axis thereof, and extending close to the wall of the hopper substantially parallel thereto. These rods are provided at the lower ends thereof with fingers 77 welded or otherwise connected to said rods, and wedge-shaped on their upper and lower sides to gently part the mass of solids as the rods are reciprocated. By means of this construction, the mass of solids in the hopper 10 is gently stirred at or near the region where the greatest tendency to arch over or jam is present, without materially agitating, compressing or crushing the solids.

Means are provided for reciprocating the rods 76 continuously and in alternate directions in synchronism with the operation of the rotor 20. In the specific form shown, said means includes a conical cam member 79 driven about a vertical axis from the drive shaft 18 and cooperating with a pair of cam followers 80 connected respectively to the rods 76. The cam followers include rods 81 carrying at their lower ends freely rotatable rollers 82 extending in a cam groove 83 formed on the outer periphery of the cam member 79. The peripheral surface of the cam member 79 has a taper similar to that of the hopper 10 so that the two surfaces have corresponding parallel generatrices and the rollers 82 will travel in a direction parallel to the hopper wall as the cam member 79 rotates. This movement of the cam rollers 82 is imparted to the cam followers and in turn to the rods 76 to give them a corresponding reciprocable movement.

The lower portions of the follower rods 81 are inclined parallel to the wall of the hopper, and are guided for reciprocable movement in cross heads 85 each of which is formed by a substantially U-shaped member 86 bolted to a backing plate 87 and defining therewith a guide groove 88 having a rectangular cross-section, the lower portions of the rods 81 having corresponding cross-sections. The upper portions of the follower rods 81 are substantially vertical as shown, and are connected respectively to the upper ends of the rods 76 in a manner hereinafter referred to.

Figure 19:
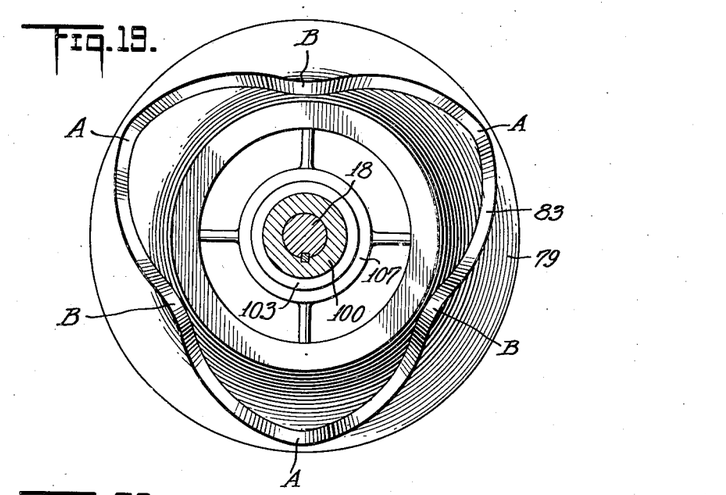
Fig. 19 is a section taken on the line 19—19 of Fig. 4.

The two cam rollers 82 are disposed on diametrically opposite sides of the axis of the cam member 79. The cam groove 83 is sinuous and so designed that its highest or peak portions A (Fig. 19) determining the upper ends of the follower strokes, are disposed diametrically opposite to its lowest or base portions B determining the lower ends of said strokes. Three peak portions A are shown spaced 120° apart, and three base portions B similarly spaced and disposed midway between adjacent peak portions, so that each cam roller will make three complete strokes during each revolution of the cam member 79. The cam rollers always travel in opposite directions so that when one roller has reached the lower end of its downward stroke, the other roller has reached the upper end of its upward stroke.

Figures 20, 21, 22, 23:
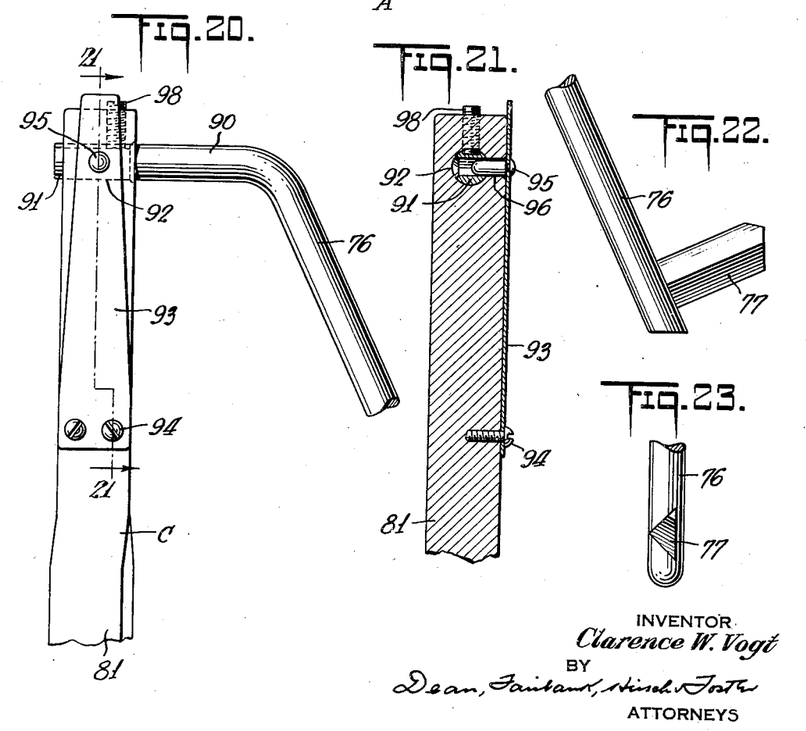

The rods 81 are connected to the rods 76 in such a manner as to facilitate the mounting or demounting of these rods. For that purpose, the upper end of each rod 76 has an offset portion 90 (Figs. 21 and 22) extending substantially horizontally and radially outwardly from the upper end of the hopper, and terminating in a reduced portion to form a shank 91. Each rod 81 at its upper end is provided with a centrally disposed hole 92 into which said shank 91 extends. The rod is twisted at a suitable section C so that the hole 92 will extend radially of the hopper 10.

In order to retain the shank 91 in the hole 92, there is provided a spring plate 93 secured at its lower end to the rod 81 by any suitable means, as for instance screws 94, and having riveted or otherwise secured to the upper end thereof a locking pin 95 adapted to extend into a hole 96 in said rod communicating with the hole 92. The shank 91 is provided with a hole into which the locking pin 95 is adapted to fit so as to prevent the withdrawal of the rod 76 from the follower rod 81. In order to insure against the accidental withdrawal or separation of the rod 76 from the follower rod 81, a set screw 98 may be provided, which extends lengthwise of the latter rod from its upper end, and which impinges on the shank 91. The spring plate 93 has its outer end extending beyond the upper end of the follower rod 81 so that it may be manually grasped and pulled to withdraw its locking pin from engagement with the push rod.

As another feature of the present invention, the connection between the drive shaft 18 and the front agitating and transfer mechanisms is such as to automatically disconnect these mechanisms from said drive shaft when said mechanisms become jammed. For that purpose, the driving shaft 18 has connected to the upper end thereof a spring clutch (Figs. 4, 16 and 17) including an inner clutch member 100 having a bore 101 for receiving the upper end of the shaft 18, and for keying said inner clutch member to said shaft. The inner end of the bore 101 forms a shoulder 102 which seats upon the upper end of the shaft 18, so that the clutch member 100 is supported on said shaft against axial movement. The upper end of the inner clutch member 100 is embraced by the peripheral wall of a cup-shaped clutch member 103 and is reduced to form an annular shoulder 104 for seating the lower end of the clutch member 103.

The outer clutch member 103 drives not only the cam member 79 but also drives the rotor shaft 21. For that purpose, the outer clutch member 103 is keyed to a stub shaft 106 by any suitable means, as for instance a taper pin 105 passing through said stub shaft 106 and the upper end wall of said clutch member. The clutch member 103 is provided with hub portions 107 and 108, the latter having a pair of diametrically oppositely disposed keyways 110 extending lengthwise thereof. The other hub portion 107 embraces the outside of the outer clutch member 103. The upper end of the stub shaft 106 and the lower end of the rotor shaft 21 extend into the hub portion 108, and are each provided with a diametrically extending slot 111 having a key 112 which is welded or otherwise secured therein, and which has its ends extending into the keyways 110. These ends of the shafts 21 and 106 are separated by a suitable plate 113.

The clutch is automatically operable to disconnect the rotor shaft 21 and the cam member 79 from the drive shaft 18 when the load thereon reaches a predetermined amount. For that purpose the inner clutch member 100 is provided in its upper portion with a diametrically extending slot for receiving a pair of clutch spring housings 115 movable towards and away from each other, and forming one or more pairs of alined cylindrical chambers 116a. In each pair of alined chambers is a clutch spring 117 normally operating to spread the two spring housings 115 away from each other and towards the peripheral wall of the outer clutch member 103. One of the clutch spring housings 115 is provided with a finger 116 extending lengthwise thereof and adapted to fit into a groove 117 formed in the inner periphery of the outer clutch member 103. As long as the resistance of the agitating and transfer mechanisms does not exceed a certain amount, the clutch springs 117 have sufficient strength to hold the inner and outer clutch members in interlocked position with the finger 116 in the groove 117 of the outer clutch member. As soon as the load on these mechanisms exceeds a predetermined amount, the finger 116 will slip from its holding groove 117 and cause the rotation of the inner clutch member 100 without rotating the outer clutch member 103. Each time the finger 116 moves into registry with the groove 117, said finger will snap therein and cause intermittent clicking, so that the operator will known that the machine is jammed.

As a feature of the present invention, the entire machine is portable and so constructed that it may be easily disassembled and cleaned. Furthermore, the cam member 79 and the driving mechanism are so located as to assure against contamination thereof by the material being operated upon. For that purpose, the driving mechanism including the motor 13, the variable speed transmission 14, and the speed reducer 17, are enclosed in a housing 120 and supported on a plate 121 extending horizontally therein. The housing 120 is supported on casters 119 so as to render it portable. The operating handle 16 for the variable speed transmission 14 extends outside of the housing to render it more easily accessible for operation.

The cam member 79 is also enclosed in the housing 120 and is disposed directly below the cover plate 122 of said housing. The rotor shaft 21 passes through an opening in said cover plate, a sealing flange 123 being provided which is bolted to said cover plate, and which has a circular flange 124 closely embracing the rotor shaft 21 to prevent any of the material being operated upon from dropping into the housing through said opening.

The transfer member is supported upon and fixed to the cover plate 122. For that purpose, the rotor casing 22 is provided with a plurality of depending legs 125, three of such legs being shown spaced 120° apart. In order to clamp the casing 22 in position, the header 23 is provided with a plurality of radially outwardly extending lugs 126, three of such lugs being shown spaced 120° apart. Passing through the lugs 126 and the legs 125 are fastening members 127, which, in the form shown, include tie studs 128, the lower ends of which are screwed into nuts 130 welded or otherwise fixed to the underside of the cover plate 122, the upper ends being engaged by wing nuts 131.

The header 23 fits tightly against the upper portion of the casing 22 so that the fastening members 127 serve not only to clamp the casing in position but also to clamp the header 23 over said casing. By means of this arrangement, the transfer mechanism including the hopper 10 may be removed as a unit by merely removing the wing nuts 131 and moving the whole mechanism bodily upwardly to bring the lower part of the rotor shaft 21 out of engagement with the hub and above the cover plate 122. By fixing the nuts 130 in position on the underside of the cover plate 112, the fastening members 127 may be removed without the necessity of any manipulation in the interior of the housing 120.

The cross heads 85 are also fixed to the cover plate 122. For that purpose, each U-shaped member 86 has a flange 132 secured to the cover plate by means of bolts 133 screwed into nuts 134 welded or otherwise fastened to the underside of the cover plate 122.

The cover plate 122 is provided with openings 135 to permit the passage therethrough of the follower rods 81, and also to permit the lower portion of the backing plate 87 to extend into the interior of the housing 120.

Having thus described my invention, what I claim as new and desire to secure by Letters Patent is:—

1. In combination, a receptacle for receiving edible solids, a chamber adapted to serve as part of a confining passageway for a continuously flowing stream of partially frozen edible plastic material, a substantially vertical pocket communicating directly with the outlet end of said receptacle to receive a predetermined charge of solids by gravity from said receptacle, means for moving the filled pocket away from filling position and into discharging position with respect to said chamber, and means carried in said pocket for forcing said solids from said pocket into said chamber.

2. A machine of the class described including a vertically disposed, horizontally movable, charge receiving pocket, a confining duct for a flowing stream of plastic edible material, means for moving said pocket horizontally from filling position where it is out of communication with said duct, into a discharging position in communication with said duct.

3. In a machine of the class described, a hopper adapted to receive edible solids, a pocket disposed directly underneath said hopper and positioned so that the solids are fed directly into said pocket by gravity from said hopper, a chamber adapted to serve as a passageway for a continuously flowing stream of edible plastic material, and positive displacement means for moving said pocket from its filling position into discharging position with respect to said chamber, and for injecting said solids into said chamber.

4. In a machine of the class described, a hopper, a rotor having a charge receiving pocket spaced from its axis, said rotor being disposed directly underneath said hopper and so positioned that said pocket moves across the outlet end of said hopper and in direct communication therewith as said rotor is rotated, a plunger in said pocket, a mixing chamber in the path of travel of said pocket and adapted to define a part of a predetermined flow path for a plastic material, and means for sliding said plunger in its pocket as the rotor rotates, to receive a charge of solids from said hopper when traveling across the outlet end of said hopper, and to discharge the contents of said pocket into said chamber when said pocket is in registry with said mixing chamber.

5. A machine of the class described including a conduit for receiving a horizontally flowing plastic mass, means for injecting solid edible material into the lower portion of said stream and stationary means for directing said solid material upwardly into the stream.

6. In combination, a conical hopper adapted to receive solid edible material, and means for preventing the arching over or jamming of said solid material across said hopper and including a pair of rods extending into said hopper on diametrically opposite sides of the axis of said hopper and substantially parallel to the inner wall thereof in close proximity thereto, and means for reciprocating said rods continuously and in opposite directions.

7. In combination, a hopper adapted to receive solid edible material, a chamber serving as a passageway for a continuously flowing stream of plastic material, positive displacement means for transferring successive batches of solid material from said hopper to said chamber, and for forcing them into said chamber, and means for preventing the arching over or jamming of the solid material across said hopper, and including an agitator disposed adjacent the outlet of said hopper and means for actuating said agitator lengthwise of said hopper in synchronism with the operation of said positive displacement means.

8. A machine of the class described, including a filling station for edible solid materials, a rotor defining a pocket for gravitationally receiving a charge of solids from said filling station, a stationary casing surrounding said rotor, a header plate for said casing and having a portion thereof defining with one end of said rotor a chamber in the path of movement of said pocket, and serving as a passageway for a continuously flowing stream of plastic edible material, and means for ejecting said charge from said pocket when the latter is moved into communication with said chamber.

9. A machine of the class described including a drive, a pair of chambers, one of which is adapted to contain edible solids, and the other of which is adapted to serve as a passageway for a continuously flowing stream of partially frozen ice cream in a plastic condition, a rotary transfer mechanism for removing separate measured quantities of the solids in succession from one chamber and forcing them into the other, and a drive connection between said drive and said transfer mechanism, and including a clutch automatically operable to break said connection when the load on said transfer mechanism reaches a predetermined amount.

10. A machine of the class described, including a drive, a pair of chambers, one of which is adapted to contain edible solids, and the other of which is adapted to serve as a passageway for a continuously flowing stream of partially frozen ice cream in a plastic condition, a rotary transfer mechanism for removing separate measured quantities of the solids from one chamber and forcing them into the other, and a drive connection between said drive and said transfer mechanism, and including a clutch automatically operable to break said connection when the load on said transfer mechanism reaches a predetermined amount, and to reestablish said connection when the load has fallen below a predetermined amount.

11. In a machine of the class described, a hopper, a rotor having a charge receiving pocket spaced from its axis, said rotor being disposed directly underneath said hopper and so positioned that said pocket moves across the outlet end of said hopper and in direct communication therewith as said rotor is rotated, a plunger in said pocket, a mixing chamber in the path of travel of said pocket and adapted to define a part of a predetermined flow path for a plastic material, and means for sliding said plunger in its pocket as the rotor rotates, to receive a charge from said hopper when traveling across the outlet end of said hopper, and to discharge the contents of said pocket into said chamber when said pocket is in registry with said mixing chamber, and a member coacting with an end surface of the rotor to seal the mouth of the pocket as it passes from registration with the hopper and as it passes out of registration with the mixing chamber.

12. In a machine of the class described, a hopper, a rotor having a pocket spaced from its axis, said rotor being disposed directly underneath said hopper and so positioned that said pocket moves across the outlet end of said hopper and in direct communication therewith as said rotor is rotated, a plunger in said pocket, a mixing chamber in the path of travel of said pocket and adapted to define a part of a predetermined flow path for a plastic material, and means for sliding said plunger in its pocket as the rotor rotates, to receive a charge directly from said hopper when traveling across the outlet end of said hopper, and to discharge the contents of said pocket into said chamber when said pocket is in registry with said mixing chamber, a member coacting with one end of the rotor to seal the mouth of the pocket as it passes from registration with the hopper and as it passes out of registration with the mixing chamber and spring means urging the rotor endwise against said member to tightly seal the pockets when said pockets are out of charging or discharging position.

13. A machine of the class described including a hopper adapted to contain edible solids, a chamber forming part of a passageway for a continuously flowing stream of partially frozen ice cream, and a transfer mechanism including a rotor having a longitudinal bore therein spaced from the axis of said rotor and adapted to communicate with said hopper and said chamber alternately, a plunger working in said bore, cam means for cyclically retracting said plunger to define a receiving pocket at one end thereof while the bore is in communication with said hopper, and cam means for cyclically sliding the plunger to positively discharge the contents of said pocket into said chamber when said bore is in registry with said chamber.

14. A machine of the class described including a hopper adapted to contain edible solids, a passageway for a continuously flowing stream of partially frozen ice cream, said passageway having an inlet section, an outlet section and two intermediate sections connected in parallel, and means for removing separate measured portions of solids from said hopper and delivering them to one of said intermediate sections.

15. A machine of the class described including a hopper adapted to contain edible solids, a passageway for a continuously flowing stream of partially frozen ice cream, said passageway having an inlet section, an outlet section and two intermediate sections connected in parallel, and means for removing separate measured portions of solids from said hopper and delivering them to one of said intermediate sections, the latter terminating within and encircled by the other intermediate section at the point of union of said intermediate sections.

16. A machine of the class described including a hopper adapted to contain edible solids, a passageway for a continuously flowing stream of partially frozen ice cream, said passageway having an inlet section, an outlet section and two intermediate sections connected in parallel, means for removing separate measured portions of solids from said hopper and delivering them to one of said intermediate sections, and means at the end of said last mentioned section for guiding the portion of the stream immerging therefrom centrally into the portion of the stream immerging from the other intermediate section.

17. An apparatus of the class described, including a conduit, a pipe open at both ends, extending lengthwise within said conduit, sealed to said conduit at the inlet end of said pipe, and tilted towards the upper side of said conduit and extending upwardly towards the discharge end of said conduit, to bring the discharge end of said pipe nearer to the upper side than to the lower side of said conduit outlet, said conduit having an inlet on one side thereof intermediate of the ends of said pipe for a stream of plastic material, and means for delivering edible solids through said pipe.

18. An apparatus of the class described, including a hopper adapted to contain edible solids, a chamber serving as a passageway for a continuously flowing stream of plastic material under pressure, a rotor having one or more pockets spaced from its axis, said rotor being rotatable in a position to carry edibles from filling position with respect to said hopper to discharging position with respect to said chamber, a member coacting with one end of the rotor to seal the mouths of the pockets as they pass from filling position to discharging position with respect to said chamber, and spring means urging the rotor endwise against said member to tightly seal the mouths of the pockets when said pockets are out of charging or discharging position.

19. An apparatus for delivering edible solids into ice cream under pressure, including a rotor having a pocket spaced from the axis thereof, movable in a circular path, and adapted to receive a charge of the edible solids along one part of its path of movement, a conduit for continuously transporting partially frozen plastic ice cream under pressure and having one wall thereof along a substantial portion of said conduit formed by a surface of said rotor, said portion of said conduit extending in a direction substantially coincident with another part of the path of movement of said pocket, a baffle in said conduit portion, and a plunger carried in said pocket for injecting the solids from said pocket progressively into said ice cream while said pocket is moving along said portion of the conduit.

CLARENCE W. VOGT.